United States Patent
Jeong et al.

(10) Patent No.: US 11,757,094 B2
(45) Date of Patent: Sep. 12, 2023

(54) BATTERY AND METHOD OF MANUFACTURING THE SAME

(71) Applicant: SAMSUNG ELECTRONICS CO., LTD., Suwon-si (KR)

(72) Inventors: Huisu Jeong, Seongnam-si (KR); Hwiyeol Park, Ansan-si (KR); Kyounghwan Kim, Seoul (KR); Jeongkuk Shon, Hwaseong-si (KR); Junhyeong Lee, Seoul (KR); Sungjin Lim, Suwon-si (KR); Jin S. Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 518 days.

(21) Appl. No.: 16/939,208

(22) Filed: Jul. 27, 2020

(65) Prior Publication Data
US 2021/0036313 A1    Feb. 4, 2021

(30) Foreign Application Priority Data
Aug. 1, 2019    (KR) .................. 10-2019-0094020

(51) Int. Cl.
*H01M 4/36*    (2006.01)
*H01M 4/66*    (2006.01)
(Continued)

(52) U.S. Cl.
CPC ......... *H01M 4/366* (2013.01); *H01M 4/0471* (2013.01); *H01M 4/131* (2013.01);
(Continued)

(58) Field of Classification Search
None
See application file for complete search history.

(56) References Cited

U.S. PATENT DOCUMENTS

| | | | |
|---|---|---|---|
| 9,793,537 B2 | 10/2017 | Cobb et al. | |
| 9,799,920 B2 | 10/2017 | Asano et al. | |

(Continued)

FOREIGN PATENT DOCUMENTS

| | | |
|---|---|---|
| JP | 2009295514 A | 12/2009 |
| JP | 6404562 B2 | 10/2018 |
| KR | 1020130003147 A | 1/2013 |

OTHER PUBLICATIONS

Elina Pohjalainen et al., "Water soluble binder for fabrication of Li4Ti5O12 electrodes," Journal of Power Sources, Nov. 8, 2012, pp. 134-139, vol. 226.

(Continued)

*Primary Examiner* — Wyatt P McConnell
(74) *Attorney, Agent, or Firm* — CANTOR COLBURN LLP

(57) ABSTRACT

A battery includes a cathode layer, a cathode current collector on the cathode layer, an anode layer on the cathode layer, an anode current collector on the anode layer, a separator between the cathode layer and the anode layer, and an electrolyte, wherein the cathode layer includes a plurality of crystal grains of a cathode active material and aligned in a first direction, and at least one groove formed in a direction perpendicular to an upper surface of the cathode layer that is in contact with the separator, and wherein a side surface of the cathode layer exposed by the at least one groove is aligned with a <101> crystal direction, a <hk0> crystal direction, wherein h and k are integers greater than or equal to 1, or a combination thereof, of the crystal grains of the cathode active material.

20 Claims, 20 Drawing Sheets

(51) Int. Cl.
*H01M 4/04* (2006.01)
*H01M 4/1391* (2010.01)
*H01M 10/0525* (2010.01)
*H01M 4/131* (2010.01)
*H01M 50/46* (2021.01)

(52) U.S. Cl.
CPC ......... *H01M 4/1391* (2013.01); *H01M 4/661* (2013.01); *H01M 10/0525* (2013.01); *H01M 50/46* (2021.01)

(56) References Cited

U.S. PATENT DOCUMENTS

| | | |
|---|---|---|
| 10,026,967 B2 | 7/2018 | Swiegers et al. |
| 10,147,944 B2 | 12/2018 | Cho et al. |
| 2015/0236375 A1 | 8/2015 | Asano et al. |
| 2017/0162858 A1* | 6/2017 | Cobb .................. B28B 3/20 |

OTHER PUBLICATIONS

Fu-sheng Ke et al., "Fabrication and properties of three-dimensional macroporous Sn—Ni alloy electrodes of high preferential (110) orientation for lithium ion batteries," Electrochemistry Communications, Oct. 19, 2006, pp. 228-232, vol. 9.

Hui Xia et al., "Texture effect on the electrochemical properties of LiCoO2 thin films prepared by PLD," Electrochimica Acta, May 18, 2007, pp. 7014-7021, vol. 52.

P. J. Bouwman et al., "Influence of Diffusion Plane Orientation on Electrochemical Properties of Thin Film LiCoO2 Electrodes," Journal of the Electrochemical Society, Apr. 12, 2002, pp. A699-A709, vol. 149, Issue 6.

\* cited by examiner

BATTERY AND METHOD OF MANUFACTURING THE SAME

CROSS-REFERENCE TO RELATED APPLICATION

This application claims priority to and the benefit of Korean Patent Application No. 10-2019-0094020, filed on Aug. 1, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to a power storage member, and more particularly, to batteries and methods of manufacturing the batteries.

2. Description of the Related Art $LiCoO_2$ is a cathode active material for lithium ion batteries. An improved cathode active material, or a more efficient way to use a material such as $LiCoO_2$ is needed.

SUMMARY

Provided are batteries capable of increasing battery capacity and efficiency and methods of manufacturing the batteries.

Additional aspects will be set forth in part in the description which follows and, in part, will be apparent from the description, or may be learned by practice of the presented embodiments of the disclosure.

According to an aspect of an embodiment, a battery includes: a cathode layer, a cathode current collector on the cathode layer, an anode layer on the cathode layer, an anode current collector on the anode layer, a separator disposed between the cathode layer and the anode layer, and an electrolyte between the cathode layer and the anode layer, wherein the cathode layer includes a plurality of crystal grains of a cathode active material and aligned in a first direction, and at least one groove formed in a direction perpendicular to an upper surface of the cathode layer that is in contact with the separator, and wherein a side surface of the cathode layer exposed by the at least one groove is aligned with a <101> crystal direction, a <hk0> crystal direction, wherein h and k are integers equal to or greater than 1, or a combination thereof, of the crystal grains of the cathode active material.

The at least one groove may be between a first outer side surface of the cathode layer and a second outer side surface of the cathode layer, the second outer side surface may be opposite the first outer side surface, and crystal grains of the first side surface and crystal grains of the second side surface may each have a same crystal direction as crystal grains of the side surface of the cathode layer exposed by the at least one groove.

The at least one groove may be a slit-shaped groove.

The at least one groove may have a trench shape.

A width of the at least one groove may be less at a bottom surface of the cathode layer than a width of the at least one groove at an upper surface of the cathode layer, and a depth of the at least one groove may be greater than a distance between an end of the at least one groove proximate the bottom surface of the cathode layer and the bottom surface of the cathode layer.

The at least one groove may include a plurality of grooves, and depths of the plurality of grooves may be within 1 standard deviation, based on total depths of the plurality of grooves.

A ratio R may be in a range from about 2.7 to about 10.6, $$R=(I(101)+I(110))/I(003) \qquad \text{Equation 1}$$

wherein

I(101) is an intensity of an X-ray diffraction peak corresponding to the <101> crystal direction, I(110) is an intensity of an X-ray diffraction peak corresponding to a <110> crystal direction, I(003) is an intensity of an X-ray diffraction peak corresponding to a <003> crystal direction, when determined using Cu Kα radiation.

A relative density of the cathode layer may be about 90% to about 99%, based on a density of the of the cathode layer before sintering.

According to an aspect of an embodiment, disclosed is a method of manufacturing a battery, the method includes: providing a cathode layer comprising a plurality of crystal grains of a cathode active material; forming at least one groove between a first side surface of the cathode layer and a second side surface of the cathode layer; disposing a cathode current collector on a surface of the cathode layer under the at least one groove; providing an anode layer; disposing an anode current collector on a surface of the anode layer; disposing a separator on a surface of the cathode layer in which the at least one groove is formed; supplying an electrolyte to the separator; and disposing the anode layer the separator to manufacture the battery, wherein a side surface of the cathode layer exposed by the at least one groove is aligned with a <101> crystal direction, a <hk0> crystal direction wherein h and k are integers greater than or equal to 1, or a combination thereof, of the crystal grains of the cathode active material.

The method may further include forming the cathode layer by: disposing a cathode active material on a substrate to form a cathode active material tape; forming the at least one groove in a direction perpendicular to a surface of the cathode active material tape; and sintering the cathode active material tape to form the cathode layer.

The forming of the at least one groove may include forming at least one slit in the cathode active material tape.

The forming of the at least one groove may include forming at least one trench in the cathode active material tape.

The forming of the at least one groove may include forming the at least one groove in a direction from an upper surface towards a bottom surface of the cathode layer, and a depth of the at least one groove may be greater than a distance between an end of the at least one groove proximate the bottom surface of the cathode layer and a bottom surface of the cathode layer.

A ratio R may be in a range from about 2.7 to 10.6, $$R=(I(101)+I(110))/I(003) \qquad \text{Equation 1}$$

wherein

I(101) is an intensity of an X-ray diffraction peak corresponding to the <101> crystal direction, I(110) is an intensity of an X-ray diffraction peak corresponding to a <110> crystal direction, I(003) is an intensity of an X-ray diffraction peak corresponding to a <003> crystal direction, when determined using Cu Kα radiation.

A plurality of slits having a same depth may be formed in the cathode active material tape.

Also disclosed is a cathode layer including: a plurality of crystal grains of a cathode active material and aligned in a first direction; and at least one groove formed in a direction perpendicular to a surface of the cathode layer, wherein a side surface of the cathode layer exposed by the at least one groove is aligned with a <101> crystal direction, a <hk0> crystal direction wherein h and k are integers greater than or equal to 1, or a combination thereof, of the crystal grains of the cathode active material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
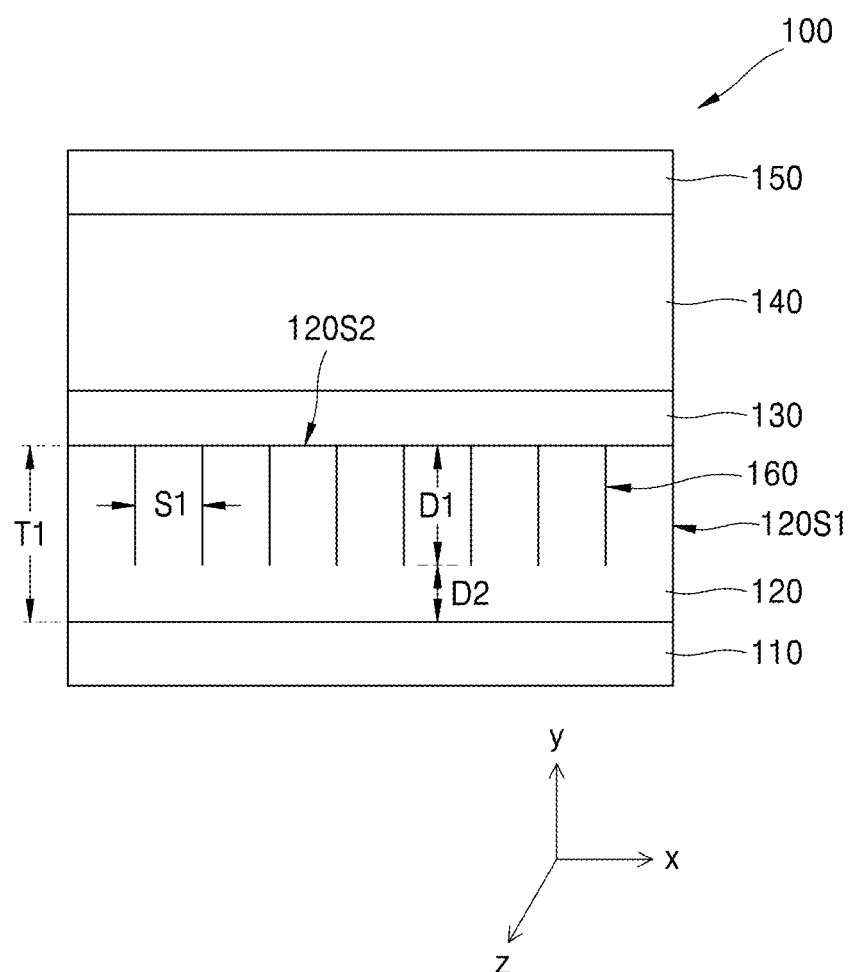
FIG. 1 is a cross-sectional view of a battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a C-rate means a current which will discharge a battery in one hour, e.g., a C-rate for a battery having a discharge capacity of 1.6 ampere-hours would be 1.6 amperes.

Crystal directions and crystal planes are described herein using Miller indices. For convenience, the indices are written in lowest terms, and corresponding directions and planes are understood to be included. Thus the direction [001] should be understood to include all equivalent directions, i.e., <001>, unless indicated otherwise, and the plane (001) should be understood to include all equivalent planes {001}, unless indicated otherwise.

$LiCoO_2$ is a layered material. An intercalating path of lithium (Li) ions in $LiCoO_2$ varies depending on a crystal plane. Therefore, when lithium ions are intercalated into $LiCoO_2$ during charge and discharge of a battery, an ion conductivity and a capacity of the battery may vary according to a crystal plane of the $LiCoO_2$ layer into which the lithium ions are intercalated. The crystal plane through which lithium ions move more readily may be (104]), (110), (101), and (102), and the diffusion of lithium ions into the (003) plane may be relatively more difficult.

The capacity and efficiency of a battery may vary depending on a direction of a surface of a three-dimensional ("3D") cathode that contacts an electrolyte. When a direction of a surface of a cathode that directly contacts an electrolyte is aligned with a <101> crystal direction, a <hk0> crystal direction (wherein h and k are integers equal to or greater than 1), or a combination thereof, of the crystal grains of the cathode active material, lithium ions may be easily diffused into the cathode, and as a result, the capacity and efficiency of the battery may be increased. In a battery, an electrolyte may directly contact an exposed surface of a cathode. Accordingly, the greater the ratio of faces, e.g., surfaces, with crystal directions aligned with a <101> crystal direction, a <hk0> crystal direction, or a combination thereof, of the crystal grains of the cathode active material, on an exposed surface of a cathode, the greater the capacity and efficiency of the battery may be. The ratio of faces, e.g., surfaces, with crystal directions aligned with a <101> crystal direction, a <hk0> crystal direction, or a combination thereof, of the crystal grains of the cathode active material, on an exposed surface in contact with an electrolyte of a sintered cathode may be increased. That is, a battery in which crystal planes having crystal directions are aligned with a <101> crystal direction, a <hk0> crystal direction, or a combination thereof, of the crystal grains of the cathode active material, are increased in a sintered cathode.

Hereinafter, the battery according to various embodiments and methods of manufacturing the same will be described in detail with reference to the accompanying drawings, and in the drawings, and in the drawings, sizes of constituent elements and thicknesses of layers and regions may be exaggerated for clarity and convenience of explanation. The embodiments of the inventive concept are capable of various modifications and may be embodied in many different forms. It will be understood that when an element or layer is referred to as being "on" or "above" another element or layer, the element or layer may be directly on another element or layer or intervening elements or layers.

FIG. 1 is a cross-sectional view of a three-dimensional (3D) battery 100 according to an embodiment. The 3D battery 100 illustrated in FIG. 1 may be regarded as one of a plurality of cell batteries considering that generally a battery includes a plurality of cell batteries. The 3D battery 100 may be a lithium ion battery (secondary battery) having a 3D cathode structure.

Referring to FIG. 1, the 3D battery 100 according to an embodiment includes a cathode current collector 110, a cathode layer 120, a separator 130, an anode layer 140, and an anode current collector 150. The separator 130 is disposed between the cathode layer 120 and the anode layer 140. The separator prevents direct contact between the cathode layer 120 and the anode layer 140. The cathode layer 120 is disposed between the separator 130 and the cathode current collector 110. The anode layer 140 is disposed between the separator 130 and the anode current collector 150. When the cathode current collector 110 is a base layer, the cathode layer 120, the separator 130, the anode layer 140, and the anode current collector 150 may form a layer structure by sequentially stacking on the cathode current collector 110.

The crystal direction of a side surface 120S1 of the cathode layer 120 may be aligned with a <101> crystal direction, a <hk0> crystal direction, wherein h and k are integers greater than or equal to 1, or a combination thereof, of the crystal grains of the cathode active material. The alignment of the crystal direction may be provided by sintering the cathode layer. The side surface 120S1 of the cathode layer 120 is parallel to a y-z plane. In an embodiment, the crystal direction of the side surface 120S1 of the cathode layer 120 may be aligned with a <101> crystal direction, a <110> crystal direction, or a combination thereof, of the crystal grains of the cathode active material. In an embodiment, the crystal direction of the side surface 120S1 of the cathode layer 120 may be aligned with a <101> crystal direction; a <120> crystal direction, a <220> crystal direction, a <210> crystal direction, a <130> crystal direction, a <230> crystal direction, a <330> crystal direction, or a combination thereof; or a combination thereof, of the crystal grains of the cathode active material. The crystal direction of an upper surface 120S2 of the cathode layer 120 may be aligned with a <003> crystal direction, a <104> crystal direction, or a combination thereof, of the crystal grains of the cathode active material. The upper surface 120S2 is parallel to an x-z plane.

Figure 2:
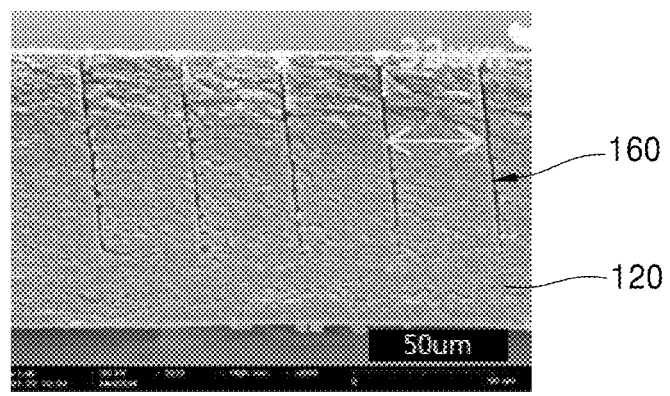
FIG. 2 is a micrograph showing slits formed in a cathode layer of the battery of FIG. 1.

A plurality of slits 160 are formed in the cathode layer 120. Each of the plurality of slits 160 may be referred to as a slit-shaped groove. In an embodiment, the plurality of slits 160 may be parallel to each other. The plurality of slits 160 are formed in a direction perpendicular to an upper surface of the cathode current collector 110 or in a direction perpendicular to a surface (an upper surface) 120S2 of the cathode layer 120 that is in contact with the separator 130. Here, the perpendicular direction may include a right angle with respect to the upper surface of the cathode current collector 110, or an inclination angle that does not deviate from a given angle (for example, 45°) from the right angle to the right and left sides. A gap S1 between the plurality of slits 160 is less than a depth D1 of the plurality of slits 160. The depth D1 of the plurality of slits 160 may be less than a thickness T1 of the cathode layer 120. The plurality of slits 160 are formed from the upper surface toward a bottom surface of the cathode layer 120. The plurality of slits 160 are spaced apart from the bottom surface of the cathode layer 120. A distance D2 between the lower ends of the plurality of slits 160 and the bottom surface of the cathode layer 120 is less than the depth D1 of the plurality of slits 160. In an embodiment, the thickness T1 of the cathode layer 120 may be in a range from about 30 micrometers (μm) to about 200 μm and the distance D2 may be in a range from about 5 μm to about 50 μm. FIG. 2 is a micrograph showing the plurality of slits 160 formed in the cathode layer 120 of the battery of FIG. 1. In the micrograph, the plurality of slits 160 are formed at intervals of 32 μm from one another.

The plurality of slits 160 may be formed by cutting a cathode tape or a cathode active material tape corresponding to the cathode layer 120 before sintering to a given depth D1 by using a blade. The cathode active material tape may be cut in a direction perpendicular to the upper surface thereof, and may be cut within a range in which the cathode active material tape is not cut.

Therefore, in the cathode layer 120, side surfaces of parts where the slits 160 are formed are exposed through, e.g., exposed by or adjacent to, the slits 160. Each of the plurality of slits 160 may be regarded as a trace or a scratch of the part cut by a knife or as a kind of groove in a broad sense. In an aspect, each of the plurality of slits 160 may be a wedge-shaped groove, a bottom of which is not visible because an entrance is very narrow. Therefore, through each of the plurality of slits 160, a surface, such as a bottom surface exposed in a groove of a general trench type, may not be exposed.

When there is a single slit 160 between both sides 120S1 of the cathode layer 120, two side surfaces are exposed inward through the slit 160. Due to the nature of the slit 160, the side exposed inward through the slit 160 is not visible in the diagram. The two side surfaces exposed inward may be parallel to the side surface 120S1 of the cathode layer 120. Therefore, a crystal direction of an inner side surface exposed through, e.g., exposed by or adjacent to, the slit 160 of the cathode layer 120 may also be the same as the crystal direction of the side surface 120S1 of the cathode layer 120. Since a plurality of slits 160 are present in the cathode layer 120, side surfaces corresponding to twice the number of slits 160 are exposed through, e.g., exposed by or adjacent to, the plurality of slits 160. As a result, an area occupied by the surface aligned with a <101> crystal direction, a <hk0> crystal direction, or a combination thereof, of the crystal grains of the cathode active material, on exposed surfaces in contact with the electrolyte of the cathode layer 120 may be greater than an area without the slit 160. Accordingly, on a surface that directly contacts an electrolyte of the cathode layer 120, an area of surfaces having a crystal direction aligned with a <101> crystal direction, a <hk0> crystal direction, or a combination thereof, of the crystal grains of the cathode active material, may be greater than an area without the slit 160.

In this way, of surfaces that contact an electrolyte of the cathode layer 120, as an area of a surface having a relatively large diffusion coefficient of lithium (Li) ion, that is, a surface aligned with a <101> crystal direction, a <hk0> crystal direction, or a combination thereof, of the crystal grains of the cathode active material, is increased, in the cathode layer 120, lithium (Li) ions may be diffused to a wider area. As a result, a battery capacity may be increased. Also, since an ionic conductivity is relatively high in a surface aligned with a <101> crystal direction, a <hk0> crystal direction, or a combination thereof, of the crystal grains of the cathode active material, a charge/discharge characteristic, e.g. capacity or rate capability, of a battery may be improved. For example, a charging time may be reduced.

Also, an electrolyte is present in the separator 130 and the cathode layer 120 may be permeated with the electrolyte. In an aspect, the cathode layer 120 is sintered, and the slit 160 may serve as a passage through which an electrolyte may permeate the cathode layer 120. In an aspect, the slit 160 may be a channel for supplying an electrolyte to the cathode layer 120, which may be a sintered cathode layer. Therefore, as the number of slits 160 in the cathode layer 120 increases, the plane in which the crystal direction is aligned with a <101> crystal direction, a <hk0> crystal direction, or a combination thereof, of the crystal grains of the cathode active material, increases. As a result, an area of a surface aligned with a <101> crystal direction, a <hk0> crystal direction, or a combination thereof, of the crystal grains of the cathode active material, on an entire surface of the cathode layer 120 in contact with an electrolyte is increased. Accordingly, lithium ions may be more rapidly diffused to a wider area of the cathode layer 120 relative to a cathode layer with fewer slits, and thus, a battery capacity may be increased, and the charge and discharge characteristics may be improved. In addition, a rate capability of the battery, may be improved, and thus, a battery for a device that requires a large amount of power may be provided. The characteristic may be applied to a battery 300 illustrated in FIG. 3.

In the battery 100, the cathode layer 120 which is also referred to as a cathode active material layer may be a layer including a lithium transition metal oxide, for example, an $LiCoO_2$ ("LCO") layer, but is not limited thereto. The lithium transition metal oxide may have a layered structure, and may be isostructural with $\alpha$-$NaFeO_2$. For example, the lithium oxide may include a material of the formula $Li_xMO_2$, wherein M may include cobalt (Co), nickel (Ni), manganese (Mn), or a combination thereof. Here, x may have a range of 0.2<x<1.2. The cathode layer 120 may be formed of a sintered polycrystalline ceramic formed by sintering a cathode active material. Accordingly, the cathode layer 120 may include a plurality of grains and grain boundaries between the grains of the plurality of grains. Since the cathode layer 120 is formed of a ceramic sintered body, a density or volume fraction of a cathode active material of the cathode layer 120 may be greater than the density of a cathode active material formed by mixing particles of a cathode active material, a conductive material, and a binder. Accordingly, a battery including the cathode layer 120 may have an improved battery capacity density. The cathode current collector 110 and the anode current collector 150 may include a conductive material, for example, Cu, Au, Pt, Ag, Zn, Al, Mg, Ti, Fe, Co, Ni, Ge, In, or Pd. The anode layer 140 may include a material electrode capable of receiving lithium ions coming from the cathode layer 120 during charge. The anode layer 140 may be an electrode layer including lithium, for example, and may be a lithium metal layer or a compound electrode layer including lithium, but is not limited thereto. In an embodiment, the anode layer 140 may be formed by using a material, such as graphite, silicon (Si), or a silicon alloy (Si alloy).

Figure 3:
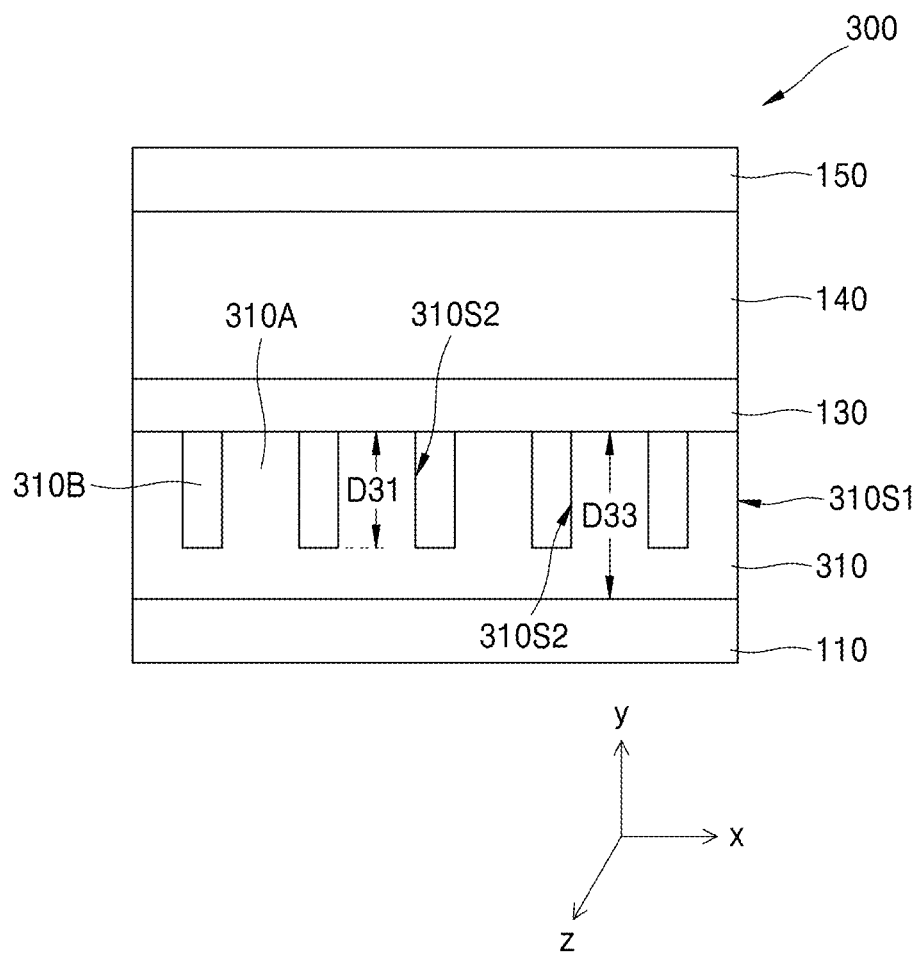
FIG. 3 is a cross-sectional view of a battery according to an embodiment.

FIG. 3 is a cross-sectional view of the battery 300 according to an embodiment. Only parts different from the battery 100 of FIG. 1 are described, and like reference numerals indicate elements that are identical to the elements of FIG. 1. Materials of a cathode layer 310, a cathode current collector 110, an anode layer 140, and an anode current collector 150 of FIG. 3 may be the same as those of the cathode layer 310, the cathode current collector 110, the anode layer 140, and the anode current collector 150 described with reference to FIG. 1.

Referring to FIG. 3, the cathode layer 310 of the battery 300 covers an entire upper surface of the cathode current collector 110. The cathode layer 310 includes a plurality of protrusions 310A that are perpendicular to a surface of the cathode current collector 110 and are directed toward the separator 130. Spaces 310B are provided between the plurality of protrusions 310A. The plurality of protrusions 310A are horizontally spaced apart from each other, but lower ends of the protrusions 310A are connected to each other. Each of the spaces 3106 may be a trench or groove of a given depth (hereinafter, referred to as a trench 310B). Accordingly, the cathode layer 310 may be expressed as having a plurality of trenches 310B spaced apart from each other. A depth D31 of each trench 310B may be greater than a half of a thickness T33 of the cathode layer 310. For example, the depth D31 of the trench 310B may be equal to the depth D1 of the slit 160 of FIG. 1. The material of the cathode layer 310 may be, for example, the same as the cathode layer 120 of FIG. 1. A crystal plane or a crystal direction of an outer surface 310S1 of the cathode layer 310 may be the same as the crystal plane or the crystal direction of the outer surface 120S1 of the cathode layer 120 of FIG. 1. A crystal plane or a crystal direction of an inner surface 310S2 of the cathode layer 310 exposed through, e.g., exposed by or adjacent to, the trench 310B may have a crystal direction having a greater diffusion coefficient than a diffusion coefficient of a <003> crystal direction or a <104> crystal direction. The crystal plane or the crystal direction of the inner surface 310S2 of the cathode layer 310 may be the same as the outer surface 310S1 of the cathode layer 310.

FIGS. 4A, 5A, 6A, and 7A are graphs showing measurement results of an X-ray diffraction ("XRD") with respect to a three-dimensional sintered cathode layer that is sintered at a given temperature (for example, 1025° C.) and in which a side surface exposed through, e.g., exposed by or adjacent to, a slit has a given crystal direction. FIGS. 4B, 5B, 6B, and 7B are photographs showing cross sections of the corresponding cathode layer of FIGS. 4A, 5A, 6A, and 7A, respectively. In each photograph, numbers such as '003', '110', and '101' indicate crystal directions of arrows. In the following description, an XRD intensity with respect to a crystal plane of a given crystal direction, for example, the crystal direction is aligned with a <003> crystal direction, is described as I(003), and XRD intensities with respect to other crystal planes are also described in the same manner. In FIGS. 4A, 5A, 6A, and 7A, a horizontal axis represents diffraction angle and a vertical axis represents XRD intensity.

Figure 4A:
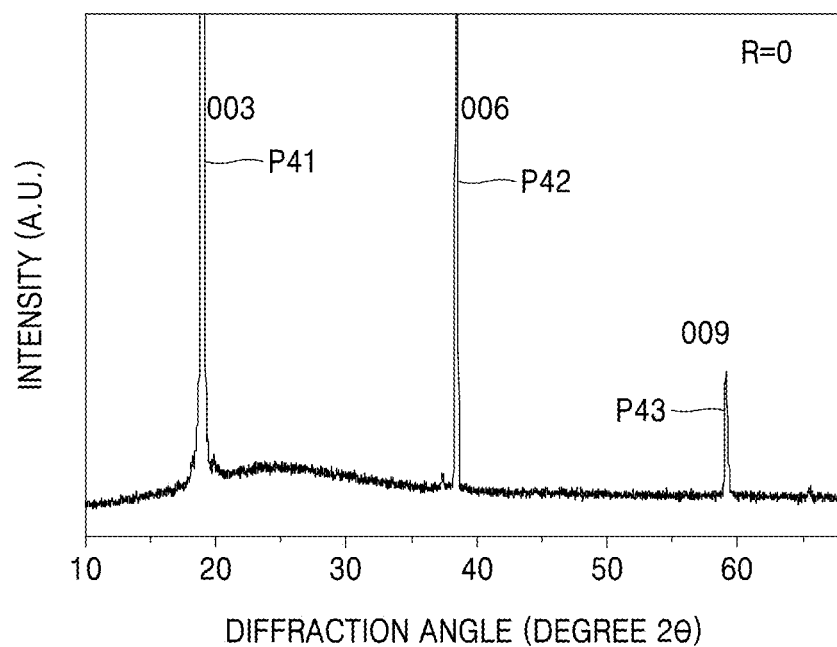
FIG. 4A is a graph of intensity (arbitrary units (a.u.)) versus diffraction angle (degrees 2θ) showing the results of a X-ray diffraction ("XRD") analysis of a three-dimensional sintered cathode layer that has a side surface that is exposed through a slit and aligned with a <003> crystal direction of the crystal grains of the cathode layer.
Figure 4B:
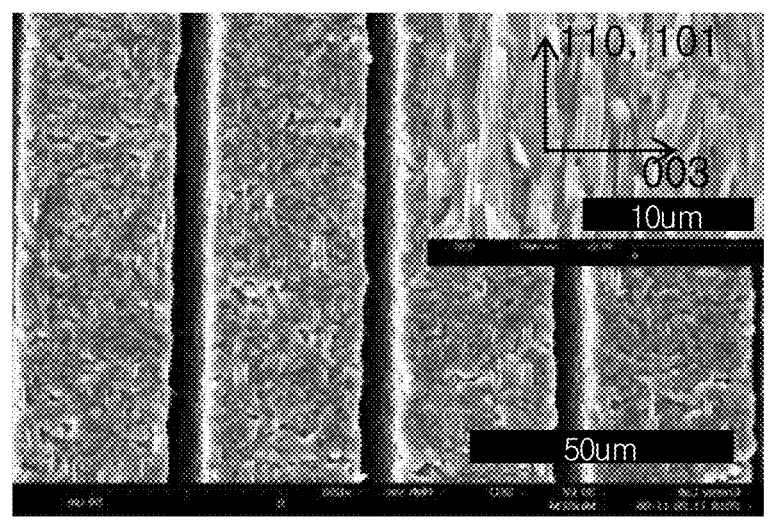
FIG. 4B is a photograph the cathode layer of FIG. 4A, showing a cross section of the cathode layer.

FIG. 4A shows a result of an XRD measurement with respect to the inner surface of a cathode layer in which a crystal direction of the inner surface is aligned with a <003> crystal direction.

Referring to FIG. 4A, in the graph showing the result of the XRD measurement, a first peak P41 represents a peak with respect to a surface having a <003> crystal direction, that is, a (003) crystal plane, and a second peak P42 represents a peak with respect to a surface having a <006> crystal direction. Also, a third peak P43 represents a peak with respect to a surface having a <009> crystal direction. In the graph of FIG. 4A, no peaks other than the first through third peaks P41 through P43 are visible. Accordingly, in the case of FIG. 4A, a ratio R is zero, wherein R is according to Equation $$R=(I(101)+I(110))/I(003)$$  Equation 1 wherein I(101) is an intensity of an X-ray diffraction peak corresponding to (101) crystal plane, I(110) is an intensity of an X-ray diffraction peak corresponding to a (110) crystal plane, and I(003) is an intensity of an X-ray diffraction peak corresponding to a (003) crystal plane, when determined using Cu Kα radiation.

Figure 5A:
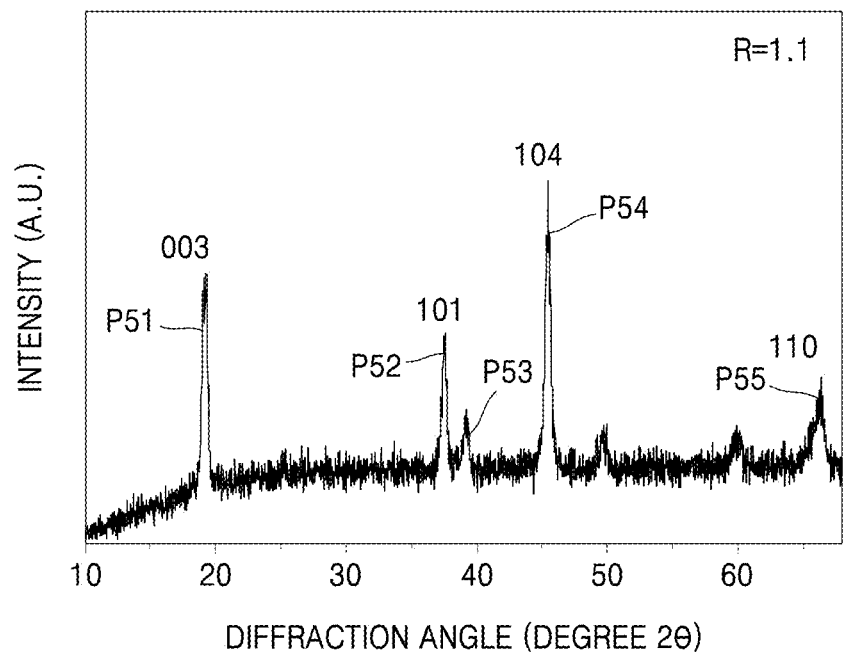
FIG. 5A is a graph of intensity (a.u.) versus diffraction angle (degrees 2θ) showing the results of XRD analysis of a three-dimensional sintered cathode layer that has a side surface that is exposed through a slit and not aligned with a crystal direction of the crystal grains of the cathode layer.
Figure 5B:
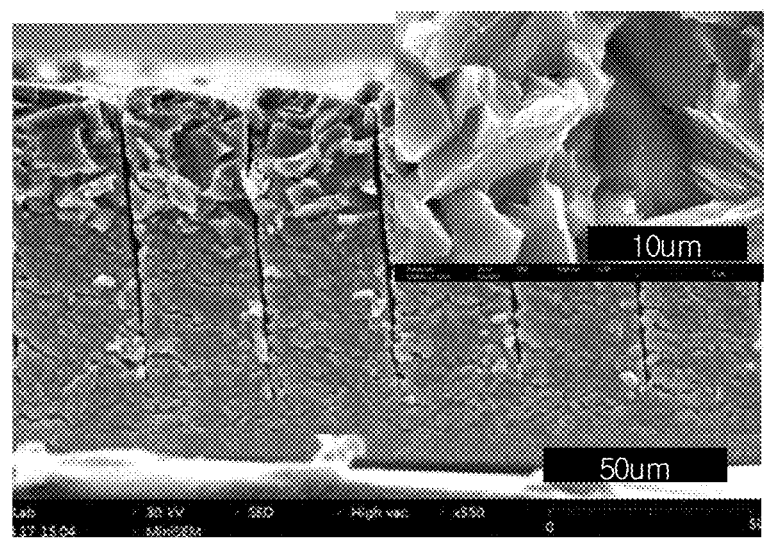
FIG. 5B is a photograph corresponding to the cathode layer of FIG. 5A, showing a cross section of the cathode layer.

FIG. 5A shows a result of an XRD measurement with respect to a cathode layer with grains not aligned in a given direction.

In the graph of FIG. 5A, a first peak P51 represents a peak with respect to a crystal plane corresponding to a <003> crystal direction, a second peak P52 represents a peak with respect to a crystal plane corresponding to a <101> crystal direction, and a third peak P53 represents a peak with respect to a crystal plane corresponding to a <006> crystal direction. Also, a fourth peak P54 represents a peak with respect to a crystal plane corresponding to a <104> crystal direction, and a fifth peak P55 represents a peak with respect to a crystal plane corresponding to a <110> crystal direction. The first and fourth peaks P51 and P54 are greater than the second, third, and fifth peaks P52, P53 and P55. In the case of FIG. 5A, when the ratio R is calculated, it will be about 1.1.

Figure 6A:
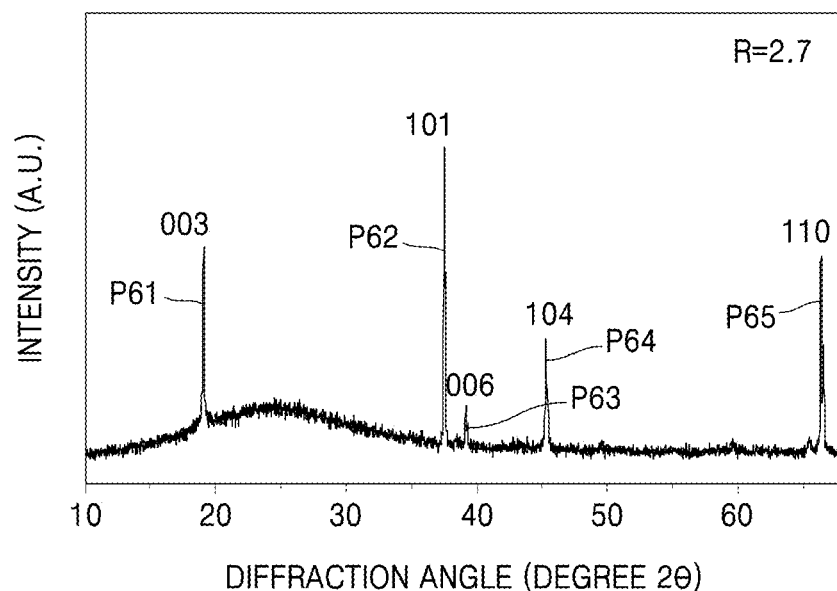
FIG. 6A is a graph of intensity (a.u.) versus diffraction angle (degrees 2θ) showing the results of XRD analysis of a three-dimensional sintered cathode layer that has a side surface exposed through a slit and aligned with <101> and <110> crystal directions of the crystal grains of the cathode layer.
Figure 6B:
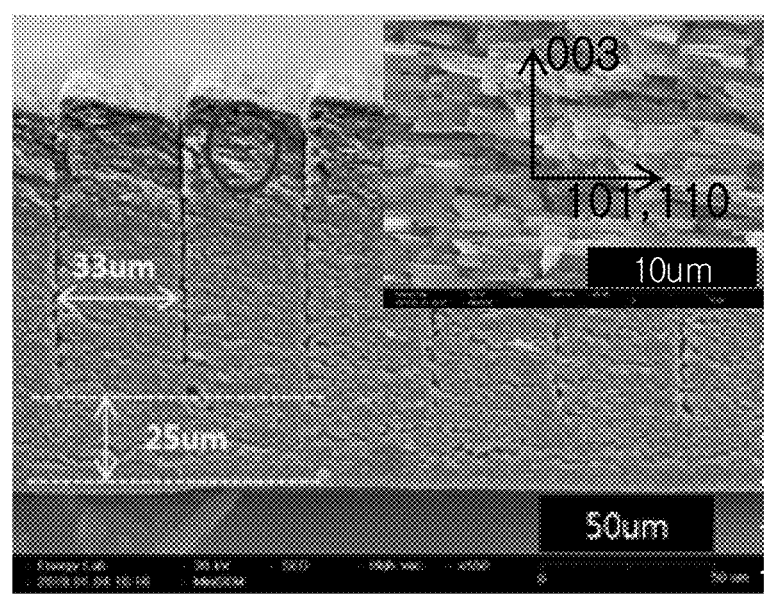
FIG. 6B is a photograph corresponding to the cathode layer of FIG. 6A, showing a cross section of the cathode layer.

FIG. 6A shows a result of an XRD measurement with respect to an inner surface of a cathode layer in which crystal directions of an inner surface of a sintered cathode are <101> and <110>.

In the graph of FIG. 6A, a first peak P61 is a peak with respect to a crystal plane corresponding to a <003> crystal direction, and a second peak P62 is a peak with respect to a crystal plane corresponding to a <101> crystal direction, the smallest third peak P63 is a peak with respect to a crystal plane corresponding to a <006> crystal direction. A fourth peak P64 is a peak with respect to the crystal plane corresponding to a <104> crystal direction, and a fifth peak P65 is a peak with respect to a crystal plane corresponding to a <110> crystal direction. In the case of the graph of FIG. 6A, the peaks of the crystal planes corresponding to the crystal directions <101>, <110>, and <003> are relatively greater than the remaining peaks. In the case of FIG. 6A, the ratio R is calculated as about 2.7.

Figure 7A:
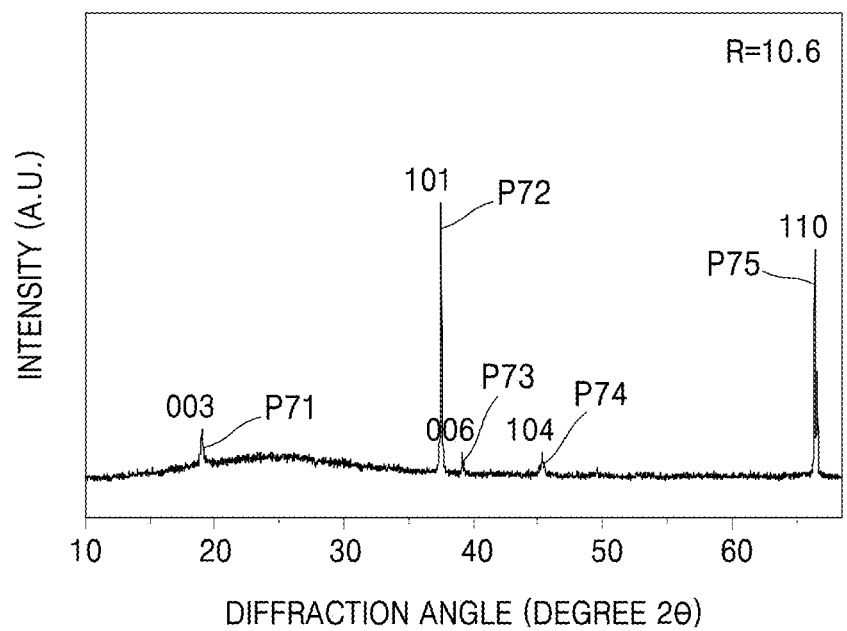
FIG. 7A is a graph of intensity (a.u.) versus diffraction angle (degrees 2θ) showing the results of XRD analysis of a three-dimensional sintered cathode layer that has a side surface exposed through a slit and aligned with <101> and <110> crystal directions of the crystal grains of the cathode layer.
Figure 7B:
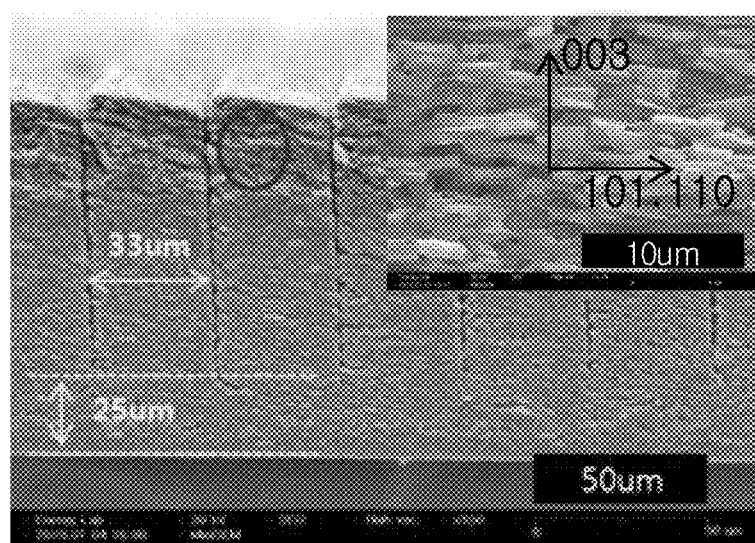
FIG. 7B is a photograph corresponding to the cathode layer of FIG. 7A, showing a cross section of the cathode layer.

FIG. 7A shows a result of an XRD measurement with respect to an inner surface of a cathode layer in which crystal directions of an inner surface of a sintered cathode are <101> and <110>.

In the graph of FIG. 7A, a first peak P71 represents a peak with respect to a crystal plane corresponding to a <003> crystal direction, a second peak P72 represents a peak with respect to a crystal plane corresponding to a crystal direction of <101>, and the smallest third peak P73 represents a peak with respect to a crystal plane corresponding to a <006> crystal direction. A fourth peak P74 the next small one represents a peak with respect to a crystal plane corresponding to a <104> crystal direction, and a fifth peak P75 represents a peak with respect to a crystal plane corresponding to a <110> crystal direction. In the case of the graph of FIG. 7A, the second and fifth peaks P72 and P75 with respect to the crystal planes corresponding to the crystal directions <101> and <110> respectively are much larger than the first, third, and fourth peaks P71, P73, and P74. The first, third, and fourth peaks P71, P73, and P74 are similar in size. Accordingly, in the case of FIG. 7A, the ratio R is calculated as about 10.6, which is the largest value among the sintered cathode layers to be measured for XRD. Considering that the larger the value of the ratio R, the better the diffusion of lithium ions into the cathode layer, the sintered cathode layer that shows the XRD characteristics of FIGS. 5A, 6A, and 7A may be considered as a 3D sintered cathode layer (the cathode layer 120 of FIG. 1 or the cathode layer 310 of FIG. 3) of a battery.

FIGS. 8 to 11 are graphs showing measurement results of a specific capacity of a battery according to a ratio R [R=(I(101)+I(110))/I(003)] of a sintered cathode layer.

Figure 8:
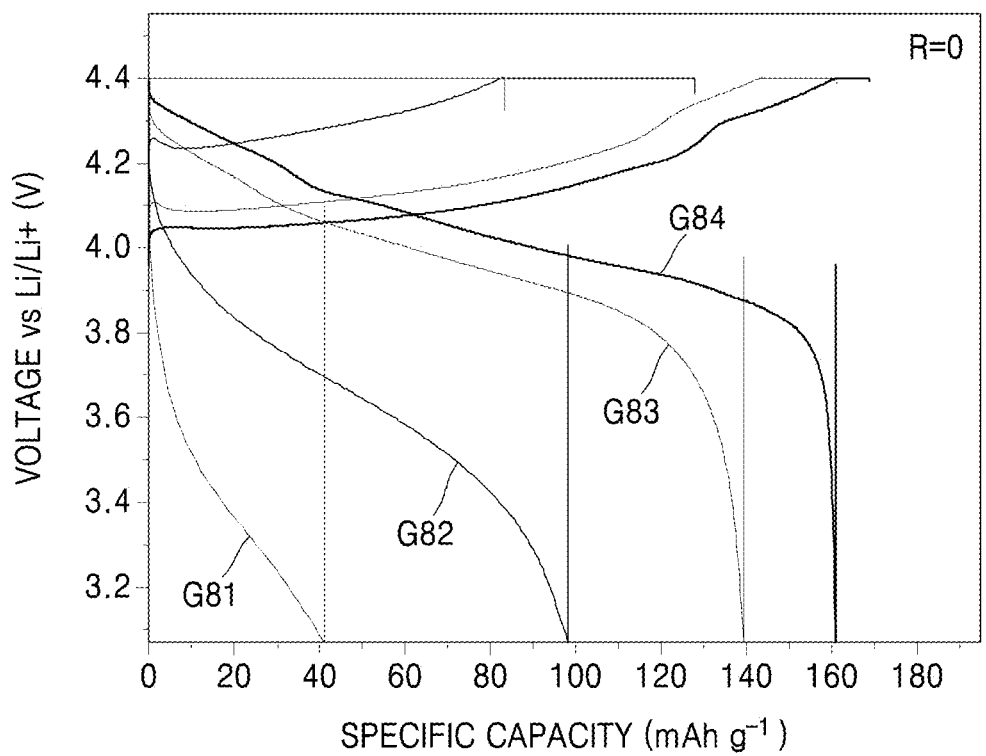
FIGS. 8 to 11 are graphs of voltage versus Li/Li+(Volts (V)) versus specific capacity (milliampere hours per gram (mAh g$^{-1}$)) showing the results of discharge and charge of a battery having a ratio [R=(I(101)+I(110))/I(003)] of a sintered cathode layer.
Figure 9:
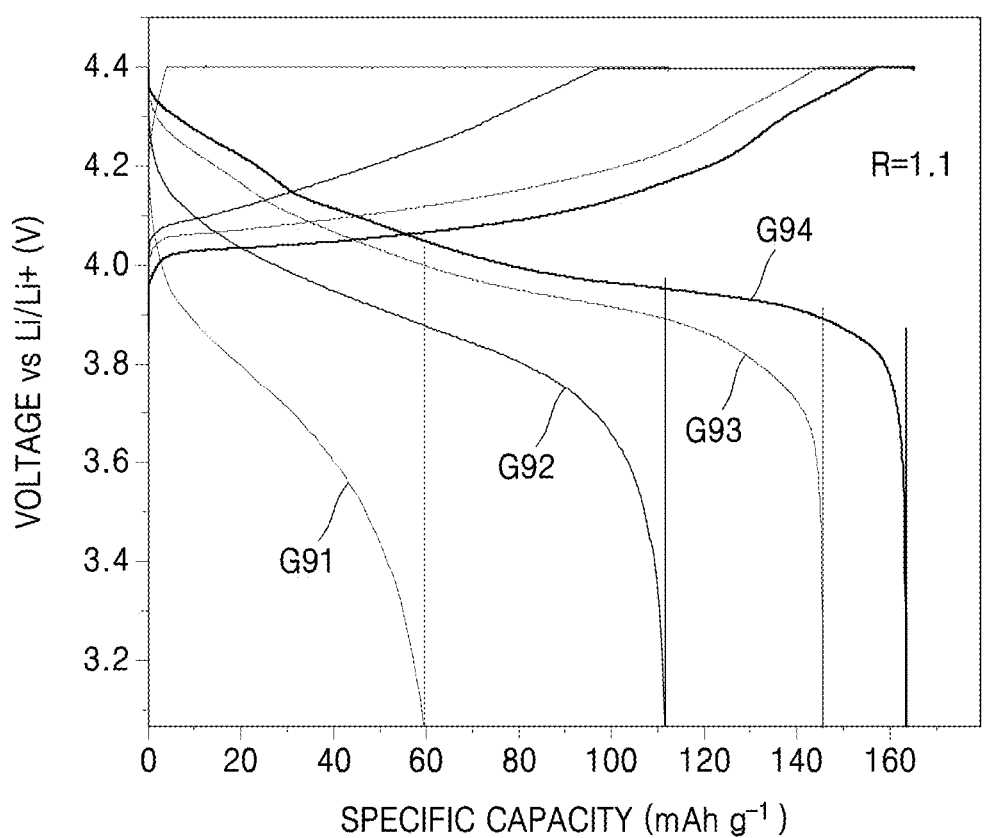
Figure 10:
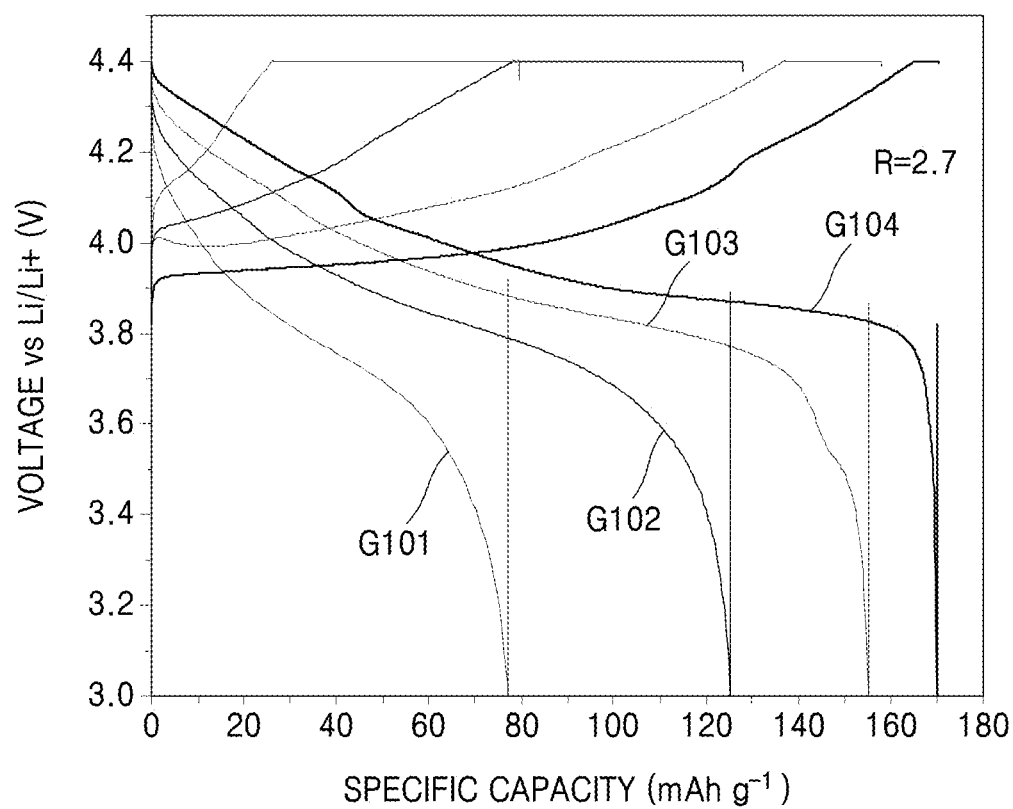
Figure 11:
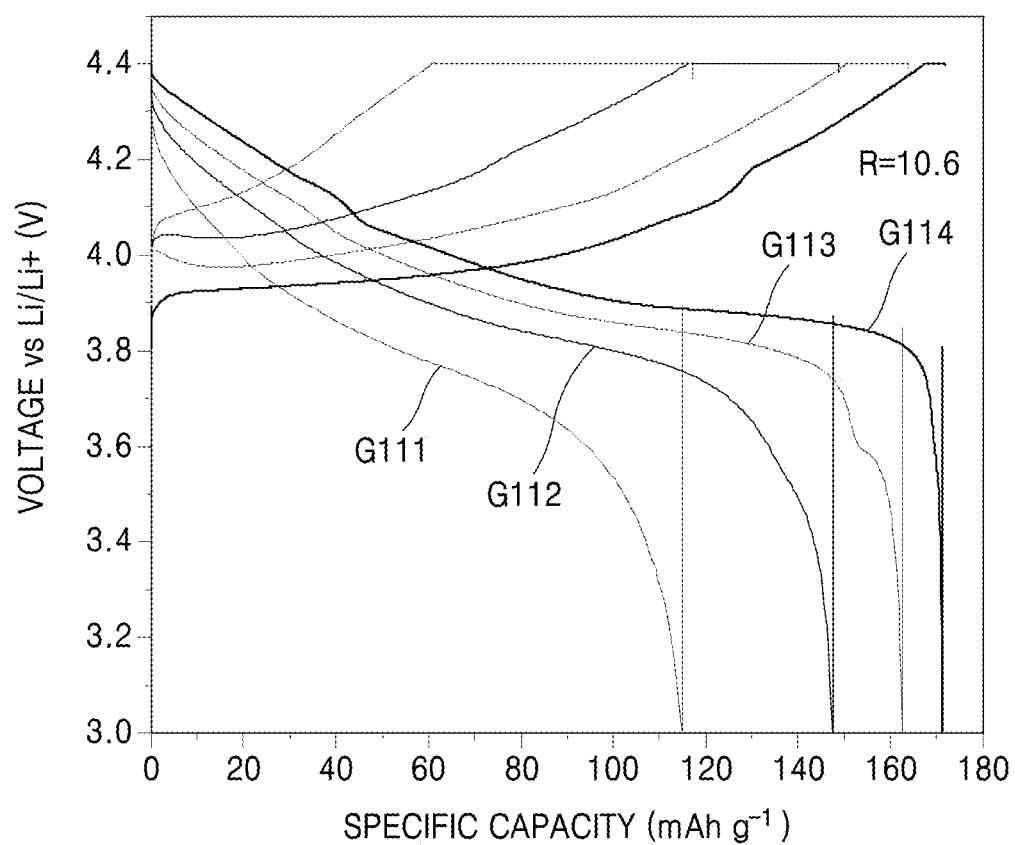

FIG. 8 shows the measurement results when R=0, FIG. 9 shows the measurement results when R=1.1, FIG. 10 shows the measurement results when R=2.7, and FIG. 11 shows the measurement results when R=10.6.

In FIGS. 8 through 11, the horizontal axis represents specific capacity and the vertical axis represents voltage versus Li/Li+. In addition, in FIGS. 8 through 11, 1st graphs G81, G91, G101, G111 show the results at the time of charging/discharging at 1 C, and 2nd graphs G82, G92, G102, and G112 show the results at the time of charging/discharging at 0.5 C, third graphs G83, G92, G103, and G113 show the results at the time of charging/discharging at 0.3 C, and fourth graphs G84, G94, G104, and G114 show the results at the time of charging/discharging at 0.1 C.

Referring to FIGS. 8 through 11, it may be seen that as the value of R increases, the specific capacity increases, and the charge/discharge characteristics are also improved.

Figure 12:
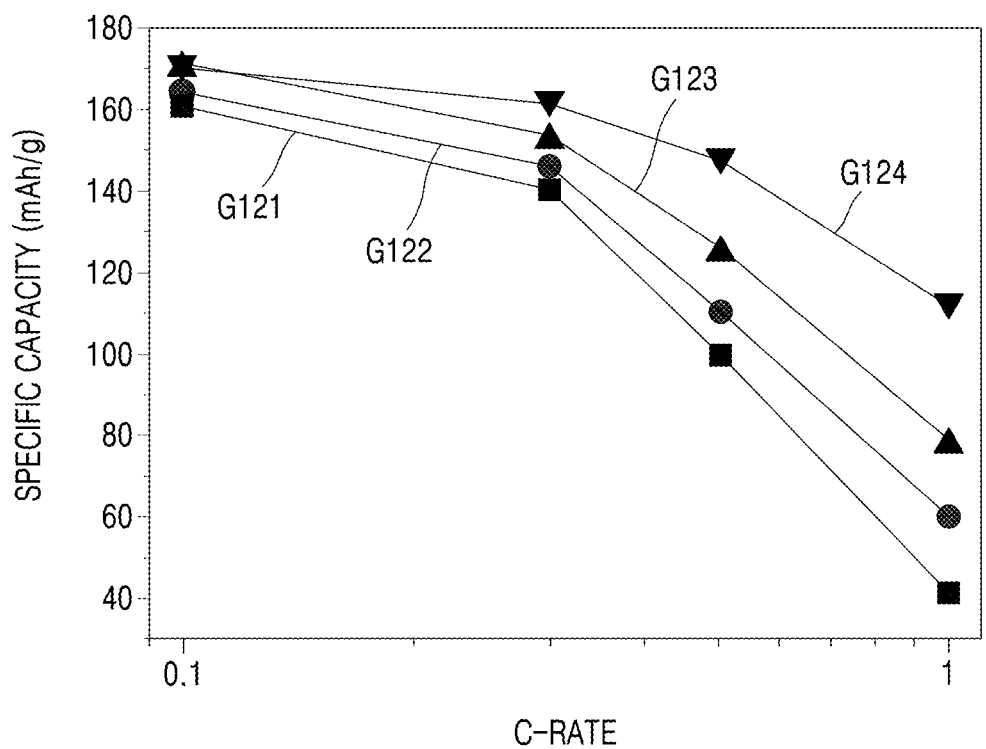
FIG. 12 is a graph of specific capacity (mAh/g) versus C-rate showing a C-rate characteristic according to an R value of the sintered cathode layer.

FIG. 12 is a graph showing C-rate characteristic according to an R value.

In FIG. 12, the horizontal axis represents rate (C-rate), and the vertical axis represents specific capacity.

In FIG. 12, first through fourth graphs G121, G122, G123, and G124 show C-rate characteristics when the R values are 0, 1.1, 2.7, and 10.6, respectively.

Referring to FIG. 12, as the R value increases from 0 to 10.6, the specific capacity also increases, but the specific capacity at 1 C increases by about 3 times.

In the batteries 100 and 300 illustrated in FIGS. 1 and 3, the cathode layers 120 and 310 are sintered cathode layers that do not include a binder and a conductive material included in a cathode layer, but have a high sintered density. As described above, since the cathode layers 120 and 310 are sintered cathode active materials that do not include a binder and a conductive material, the specific gravity of the active materials of the cathode layers 120 and 310 is increased. In addition, the cathode layers 120 and 310 have a three-dimensional structure and have a thickness greater than a thickness of a two-dimensional cathode layer. Accordingly, the energy density of a battery may also be greater than an energy density of a battery including a cathode layer including a binder and a conductive material.

Also, in the batteries 100 and 300 illustrated in FIGS. 1 and 3, a relative density of the cathode layers 120 and 310 may be 90% or greater, e.g., about 90% to about 99%, based on a density of the of the cathode layer before sintering. The relative density is a ratio (Dn1/Dn2) of a density (Dn1) of the sintered cathode layer and a density (Dn2) of a cathode layer before sintering.

FIGS. 13 through 18 are cross-sectional views illustrating a method of manufacturing a battery according to an embodiment.

Figure 13:
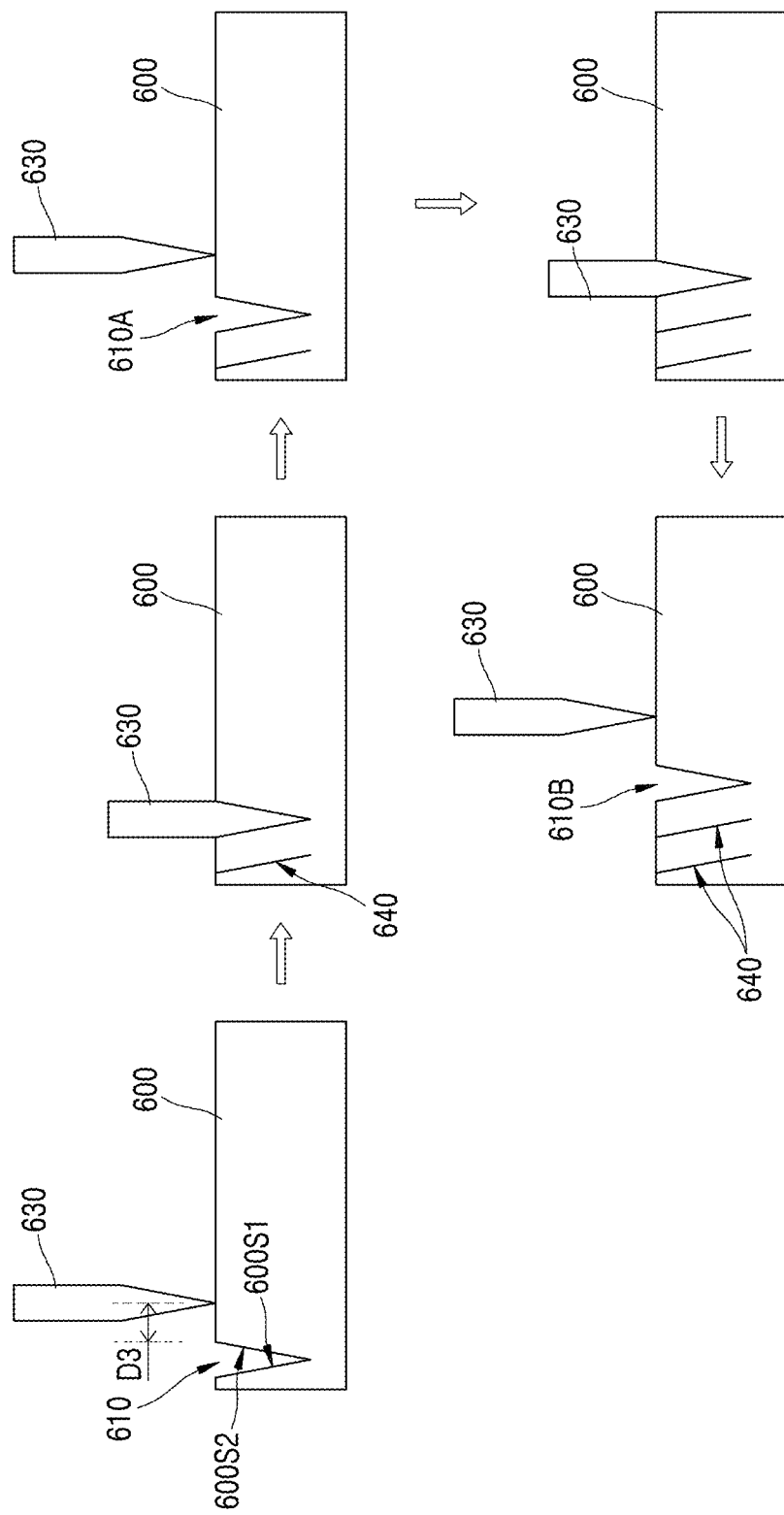
FIGS. 13 through 18 are cross-sectional views showing a method of manufacturing a battery according to an embodiment.

FIG. 13 shows an embodiment of forming a slit in the cathode layer 600 of the battery by using a blade stamping method so that a side surface (of the cathode layer 600) having a primary crystal direction aligned with a <101> crystal direction, a <110> crystal direction, or a combination thereof, of the crystal grains of the cathode active material, is exposed. The cathode layer 600 may be a cathode active material tape before sintering, that is, a cathode tape. The cathode layer 600 may be formed such that, after coating a slurry onto a carrier film through a tape casting process, and then, heat is applied to the coated slurry, whereas the slurry is formed by mixing a plurality of plate-shaped LCO seeds and a matrix LCO which is a powder of a cathode active material in a solvent. Since a doctor blade is used in a process of coating the slurry onto a carrier film, the plate-shaped LCO seeds may be aligned in a given direction, and the matrix LCO may be distributed around the plate-LCO seeds. The plate-shaped LCO seeds may have a flat shape having a very small thickness compared to its width and length. The crystal direction of a side of the plate-shaped LCO seed may be aligned with a <101> crystal direction, a <110> crystal direction, or a combination thereof, of the crystal grains of the cathode active material, and a crystal direction of an upper surface may be aligned with a <003> crystal direction, of the crystal grains of the cathode active material.

Referring to FIG. 13, in order to form a slit 640 in the cathode layer 600, a first groove 610 is formed in the cathode layer 600. The first groove 610 may have a wedge shape in which a lower point, e.g., location of the first groove 610, is sharp and a width of the first groove 610 gradually increases toward an upper end. The first groove 610 may be formed using a blade 630 disposed perpendicular to an upper surface of the cathode layer 600. The first groove 610 may be formed by applying a pressure to the blade 630 so that the blade 630 enters the cathode layer 600 in a state that the blade 630 is vertically aligned with respect to the upper surface of the cathode layer 600. After the cathode layer 600 is sintered, crystal directions of side surfaces 600S1 and 600S2 exposed through, e.g., exposed by or adjacent to, the first groove 610 formed as described above may be aligned with a <101> crystal direction, a <110> crystal direction, or a combination thereof, of the crystal grains of the cathode active material. A depth of the first groove 610 may correspond to a depth D1 of the slit 160 of FIG. 1.

Next, the blade 630 is aligned at a position spaced a given distance from a right edge of the first groove 610. The blade 630 may be perpendicular to the upper surface of the cathode layer 600. Subsequently, aligning the blade 630 to the upper surface of the cathode layer 600 may denote that the blade 630 is aligned perpendicular to the upper surface of the cathode layer 600.

A distance D3 between the right edge of the first groove 610 and the blade 630 may correspond to a spacing S1 between two adjacent slits 160 of FIG. 1. In a state that the blade 630 is aligned at a given distance D3 from the right edge of the first groove 610, a portion of the blade 630 including an end portion of the blade 630 enters into the cathode layer 600 by downwardly pressing the cathode layer 600. Since the end portion of the blade 630 has a wedge-shape, a second groove 610A is formed in the cathode layer 600 as the blade 630 enters the cathode layer 600. As the second groove 610A is formed in the cathode layer 600, the portion of the cathode layer 600 between the first groove 610 formed in the cathode layer 600 and the blade 630 is pushed to a left, and thus, the first groove 610A is filled. Thereafter, the blade 630 is removed from the cathode layer 600 and aligned at a new position of the upper surface of the cathode layer 600. The second groove 610A may be formed under the same conditions as the conditions for forming the first groove 610 by using the blade 630. Accordingly, the specifications (depth, shape, width change, etc.) of the second groove 610A may be the same as the first groove 610. Therefore, the crystal direction of side surfaces exposed through, e.g., exposed by or adjacent to, the second groove 610A may also be the same as the crystal direction of the side surfaces 600S1 and 600S2 exposed through, e.g., exposed by or adjacent to, the first groove 610. A distance between an edge of the second groove 610A and a newly aligned position of the blade 630 may be the same as the distance D3 between the edge of the first groove 610 and the blade 630 aligned to form the second groove 610A. A third groove 610B is formed in the cathode layer 600 by using the blade 630 under the same condition for forming the second groove 610A. When the third groove 610B is formed in the cathode layer 600, the portion of the cathode layer 600 between the second groove 610A and the blade 630 is pushed to the left, and thus, the second groove 610A is completely filled. Since the third groove 610B is formed under the same conditions as the first groove 610 and the second groove 610A, after the cathode layer 600 is sintered, the crystal direction of side surface exposed through, e.g., exposed by or adjacent to, the third groove 610B, like the first groove 610 or the second groove 610A, may be aligned with a <101> crystal direction, a <110> crystal direction, or a combination thereof, of the crystal grains of the cathode active material. Thereafter, fourth, fifth, and sixth grooves, etc. may be formed in the cathode layer 600 in the same manner as the second grooves 610A is formed. As a new groove is formed, a groove formed immediately ahead is filled with the cathode layer 600 laterally pushed by the blade 630. Although the previously formed grooves are filled with the cathode layer, traces of portions cut to a depth given by the blade 630, that is, slits may remain in the cathode layer 600.

In this manner, a plurality of slits 640 having the same depth are formed in the cathode layer 600 by repeating the process of forming new grooves in a given direction of the cathode layer 600 and the grooves formed immediately before the new grooves are filled with the cathode layer 600.

As a result, the cathode layer 600 having a 3D structure is formed. The slits 640 provide a plurality of gaps in the cathode layer 600 through which a liquid electrolyte may permeate.

In this way, a depth of the slits 640 and the gaps between the slits 640 may be controlled in the process of forming the slits 640. The cathode layer 600 may be cut at an operation of forming a desired number of slits 640 in the cathode layer 600. The material and thickness of the cathode layer 600 may correspond to the cathode layer 120 of FIG. 1. The depth and spacing of the slits 640 of the cathode layer 600 may be formed to correspond to the depth D1 and the spacing S1 of the slits 640 of the cathode layer 120 of FIG. 1.

Figure 14:
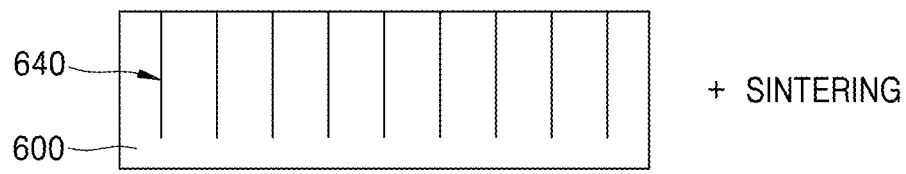

After the plurality of slits 640 are formed in the cathode layer 600 in this manner, the cathode layer 600 is sintered as depicted in FIG. 14. In the sintering process, matrix LCOs around the plate-shaped LCO seeds included in the cathode layer 600 grow along crystal planes of the plate-shaped LCO seeds.

As a result, a ceramic cathode having the plurality of slits 640 is formed, and crystal directions of the side surfaces of the cathode layer 600 exposed through, e.g., exposed by or adjacent to, the slits 640 are aligned with a <101> crystal direction, a <110> crystal direction, or a combination thereof, of the crystal grains of the cathode active material. A sintering temperature may be, for example, in a range from about 1000° C. to 1050° C., but is not limited thereto.

Figure 15:
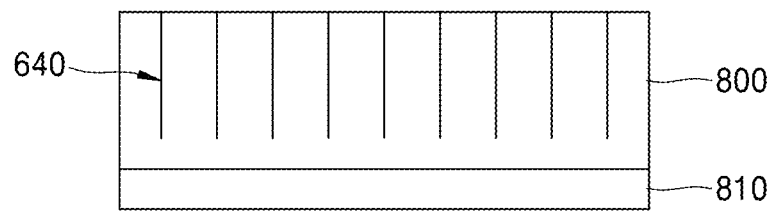

Referring to FIG. 15, a cathode current collector 810 is formed on a surface not having the slits 640 of a sintered cathode layer 800, for example, a bottom surface of the sintered cathode layer 800. For example, the cathode current collector 810 may be formed by coating a bottom surface of the sintered cathode layer 800 with a cathode current collector material. A layer structure after the cathode current collector 810 is formed is the same as the layer structure in which the sintered cathode layer 800 including the plurality of slits 640 is formed on the cathode current collector 810.

Figure 16:
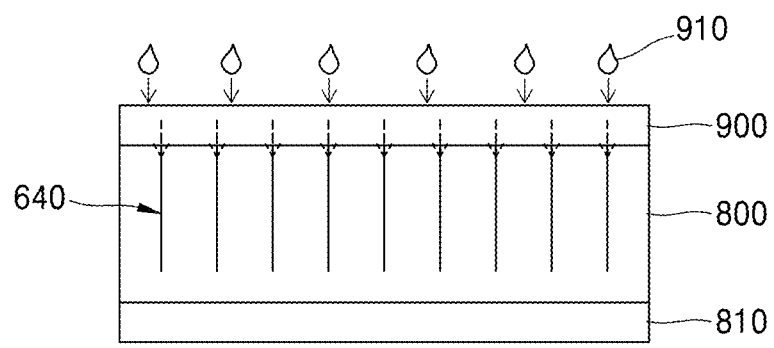

Next, referring to FIG. 16, after attaching the cathode current collector 810 to the bottom of the sintered cathode layer 800, a separator 900 is formed on the sintered cathode layer 800. The separator 900 may cover the entire slits 640 of the cathode layer 800. After the separator 900 is formed, a liquid electrolyte 910 is dropped on the separator 900 so that the liquid electrolyte 910 permeates into the cathode layer 800 through the separator 900. The liquid electrolyte 910 may permeate through the slits 640 formed in the cathode layer 800. Dashed arrows symbolically represent where the liquid electrolyte 910 dropped onto the separator 900 may permeate into the slits 640 of the cathode layer 800.

Figure 17:
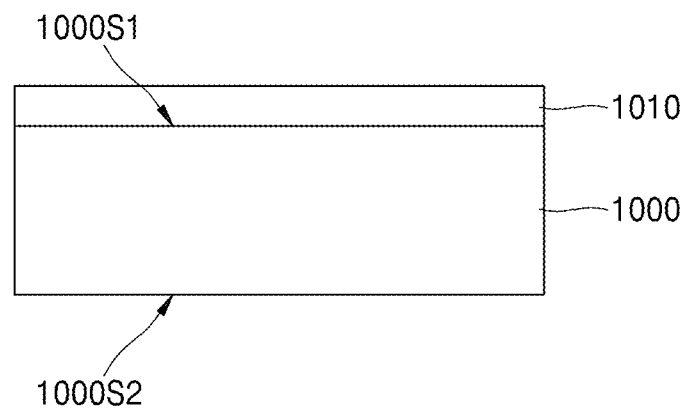

Next, as depicted in FIG. 17, an anode current collector 1010 is formed on one surface 1000S1 of an anode layer 1000. A surface 1000S1 of the anode layer 1000 may be an upper surface of the anode layer 1000. A surface 1000S2 facing the surface 1000S1 on which the anode current collector 1010 is formed may be a bottom surface of the anode layer 1000. The anode current collector 1010 may be coated to cover the entirety of the surface 1000S1 of the anode layer 1000. The process of coating the anode current collector 1010 on the one surface 1000S1 of the anode layer 1000 may be performed before obtaining the result of FIG. 16. For example, a layer structure including the anode layer 1000 and the anode current collector 1010 may be formed ahead of the layer structure including the sintered cathode layer 800 and the cathode current collector 810.

Figure 18:
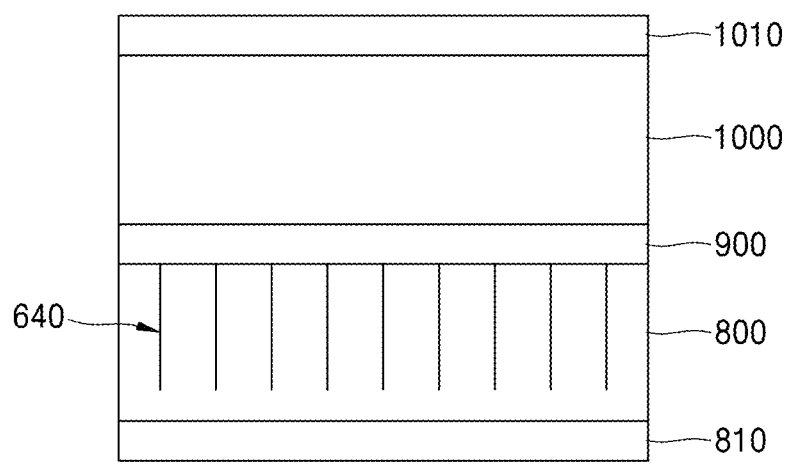

Next, as shown in FIG. 18, the resultant product of FIG. 17 is attached to the resultant product of FIG. 16. That is, after aligning a separator 900 to which the liquid electrolyte 910 is supplied and the bottom surface 1000S2 of the anode layer 1000 to face each other, the separator 900 and the bottom surface 1000S2 may be attached to each other. For example, after aligning the anode layer 1000 on the separator 900 to which the liquid electrolyte 910 is supplied so that the bottom surface 1000S2 of the anode layer 1000 faces the separator 900, the bottom surface 1000S2 of the anode layer 1000 is attached to an upper surface of the separator 900. Afterwards, a packaging process may proceed. After the plurality of batteries depicted in FIG. 18 are stacked, a packaging process may be performed.

A method of manufacturing a battery according to an embodiment will be described with reference to FIGS. 19 through 21.

Figure 19:
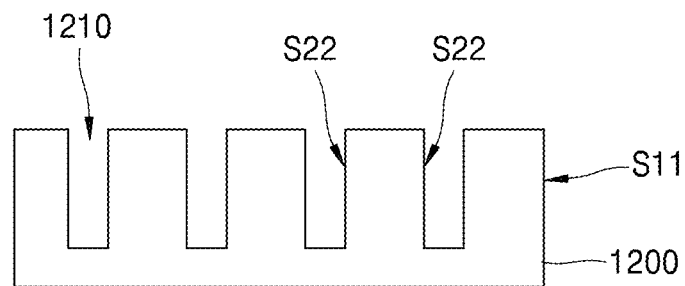
FIGS. 19 through 21 are cross-sectional views showing a method of manufacturing a battery according to an embodiment.

Referring to FIG. 19, a plurality of trenches 1210 are formed in a cathode layer 1200. The cathode layer 1200 may be the cathode layer 600 of FIG. 13. The plurality of trenches 1210 may be formed at given intervals, for example, at regular intervals. After sintering, a crystal direction of an outer side surface S11 of the cathode layer 1200 may be aligned with a <101> crystal direction, a <hk0> crystal direction, or a combination thereof, of the crystal grains of the cathode active material. The <hk0> may be the same as described above. After sintering, a crystal direction of an inner side surface S22 exposed through, e.g., exposed by or adjacent to, each of the trenches 1210 of the cathode layer 1200 may be the same as the crystal direction of the outer side surface S11. The inner side surface S22 has an area much greater than a bottom area of each of the trenches 1210. The cathode layer 1200 in which the trenches 1210 are formed is sintered. The sintering of the cathode layer 1200 may follow the sintering process of the cathode layer 600 of FIG. 13.

Figure 20:
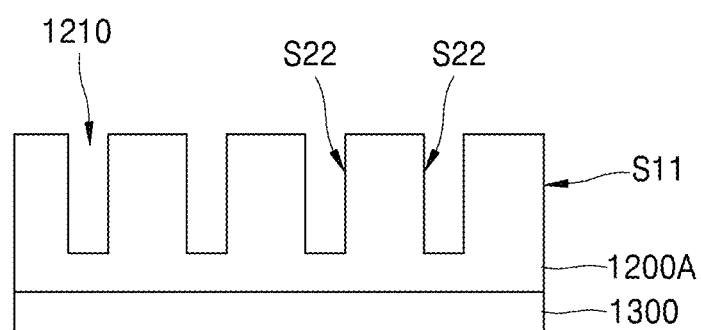

Next, as shown in FIG. 20, a cathode current collector 1300 is formed on a bottom surface of a sintered cathode layer 1200A. The cathode current collector 1300 may be coated on the bottom surface of the sintered cathode layer 1200A.

Figure 21:
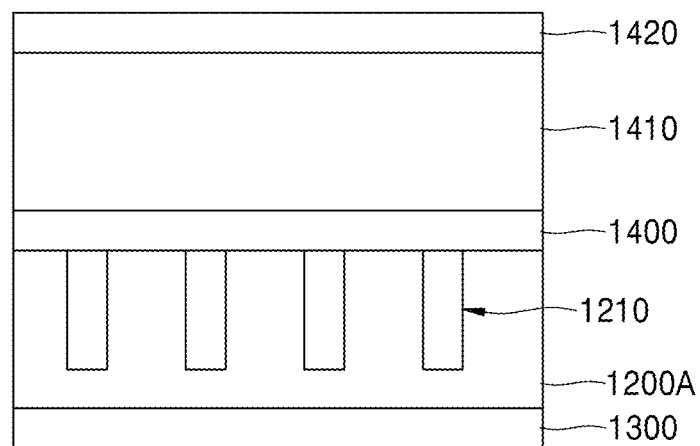

Next, as shown in FIG. 21, a separator 1400 covering the plurality of trenches 1210 is formed on the sintered cathode layer 1200A. The separator 1400 covers the entire trenches 1210 and also covers an upper surface of the cathode layer 1200A between the trenches 1210. The expression that the separator 1400 covers the entire trenches 1210 may not denote that the separator 1400 is in direct contact with inner side surfaces of the cathode layer 1200A exposed through, e.g., exposed by or adjacent to, the trenches 1210. Inlets of the trenches 1210 are covered by the separator 1400. After forming the separator 1400, the liquid electrolyte 910 as described with reference to FIG. 16 may be supplied to the separator 1400. The liquid electrolyte 910 supplied to the separator 1400 is supplied to the trenches 1210 and contacts the inner side surfaces S22 of the cathode layer 1200A exposed through, e.g., exposed by or adjacent to, the trench 1210. Through such contact, the liquid electrolyte 910 may be diffused into the cathode layer 1200A. After supplying the liquid electrolyte 910 to the separator 1400, an anode layer 1410 and an anode current collector 1420 are sequentially formed on the separator 1400. A stack including the anode layer 1410 and the anode current collector 1420 may be separately formed as described with reference to FIG. 17, and then, the stack may be attached to the separator 1400. In this way, a battery may be formed.

The battery illustrated in FIG. 21 may be a unit battery or a cell battery. A battery packaging may be formed by stacking a plurality of the unit batteries.

In the method of manufacturing the battery described above, the R value of the sintered cathode layer may be affected by the content of the matrix LCO included in the cathode layer before sintering, sintering temperature, and sintering time. The following table shows the change in R value of the sintered cathode layer according to the content (wt %) of matrix LCO contained in the cathode layer before sintering and the sintering temperature.

The present disclosure will be explained in more detail through the following Examples. However, Examples are provided herein for illustrative purpose only, and do not limit the scope of the present disclosure.

EXAMPLES

TABLE 1

R value of sintered cathode layer according to LiCoO$_2$ ("LCO") content and sintering temperature/time

| Sintering temperature/ time | UX1000 | LCO300 | Content of matrix LCO (LCO300) of Cathode Layer Before Sintering | | |
|---|---|---|---|---|---|
| | | | UX1000/ LCO300 (20 weight percent (wt %)) | UX1000/ LCO300 (40 wt %) | UX1000/ LCO300 (60 wt %) |
| 1025° C., 2 hours (h) | 9.2 | 1.1 | 9.1 | 10.5 | 8.3 |
| 1025° C., 4 h | | | 9.0 | 10.6 | 8 |
| 1050° C., 2 h | | | 10.4 | 10.6 | 3.1 |
| 1050° C., 4 h | | | 10.5 | 10.6 | 2.7 |

In Table 1, "UX1000" represents a flat LCO seed, e.g., LiCoO$_2$ having a platelet shape, and "LC0300" represents a polycrystalline LCO having a spherical shape.

Referring to Table 1, it may be seen that when a cathode layer having a polycrystalline LCO content of 40 wt % was sintered at 1025° C. or 1050° C., the R value is the largest, and a cathode layer having a polycrystalline LCO content of 20 wt % was sintered at 1050° C., the R value is the next largest.

Figure 22:
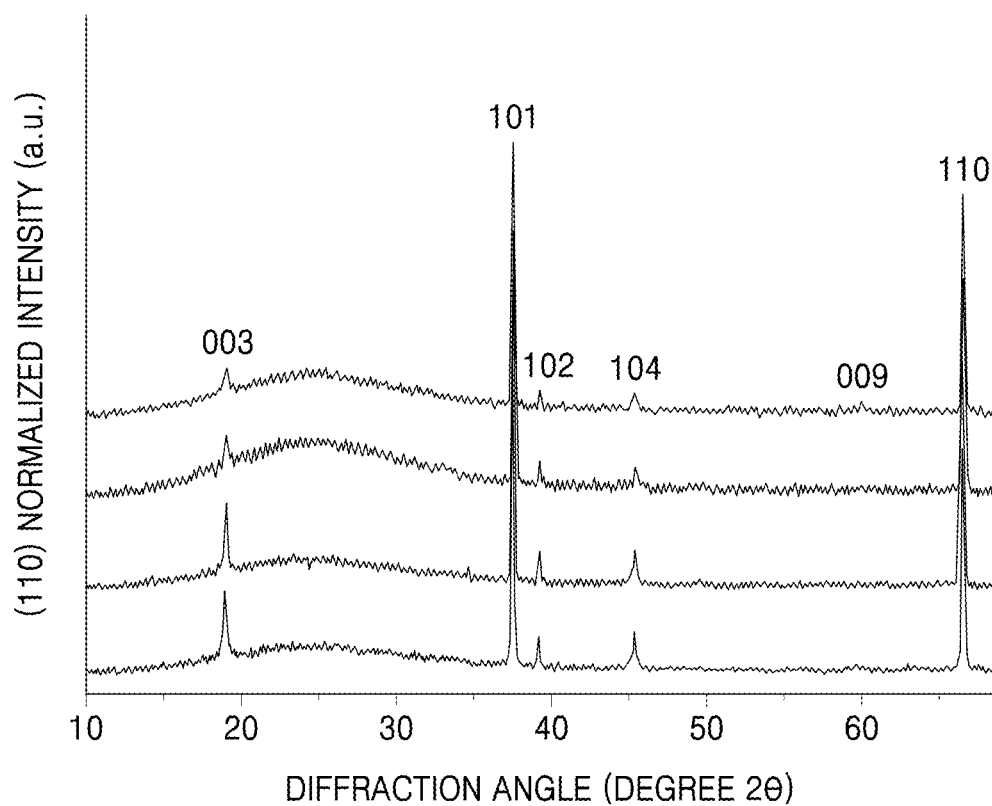
FIGS. 22 through 24 are graphs of (110) normalized intensity (a.u.) versus diffraction angle (degrees 2θ) showing the results of X-ray diffraction ("XRD") analysis of sintered cathode layers obtained by sintering the cathode layers having a matrix LiCoO$_2$ ("LCO") content of 20 weight percent (wt %), 40 wt %, and 60 wt %, respectively, for 2 hours or 4 hours at a temperature of 1025° C. or 1050° C.
Figure 23:
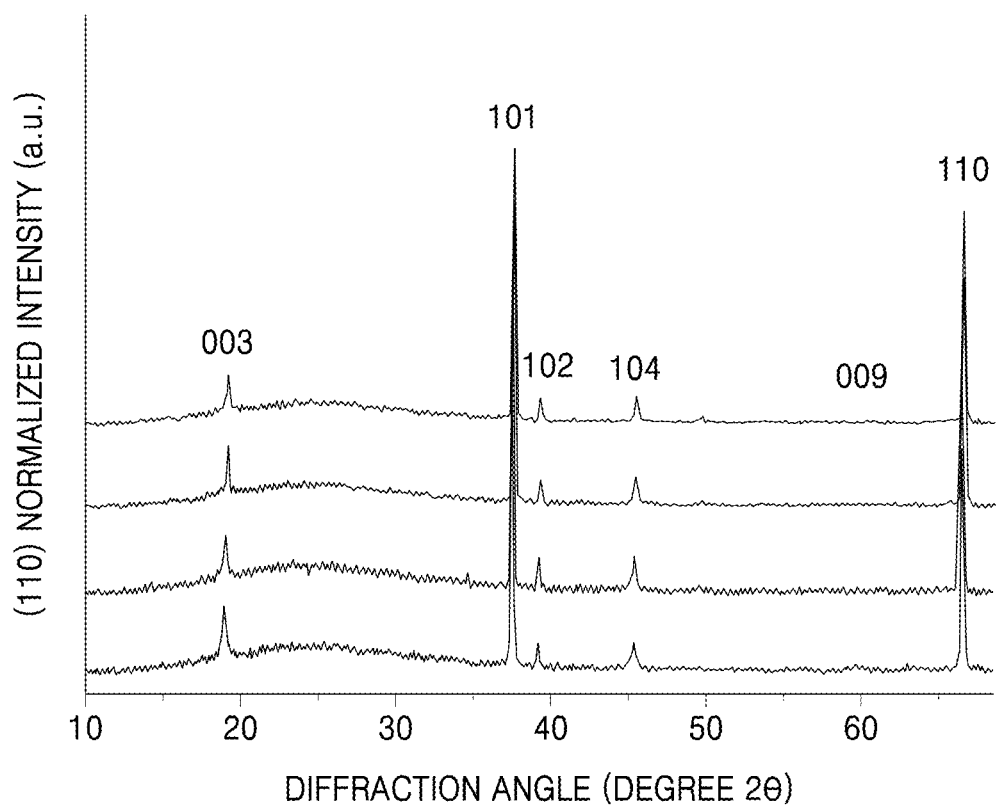
Figure 24:
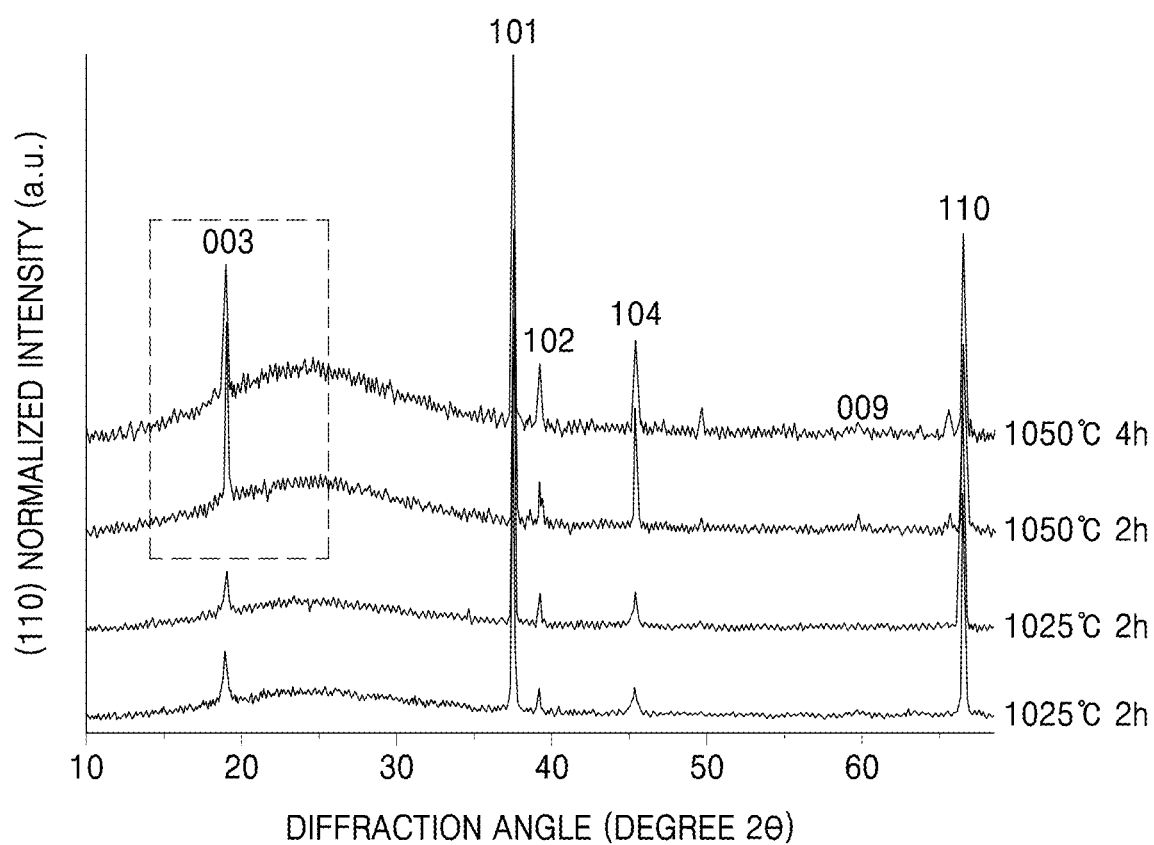

FIGS. 22 through 24 show measurement results of X-ray diffraction ("XRD") analysis of sintered cathode layers obtained by sintering the cathode layers having a polycrystalline LCO content of 20 wt %, 40 wt %, and 60 wt %, respectively, based on a total weight of the cathode layer, for 2 hours or 4 hours at a temperature of 1025° C. or 1050° C. Table 1 is prepared based on the results of FIGS. 22 to 24. In each figure, "101" denotes a peak with respect to a crystal plane corresponding to a crystal direction of <101>, "003" denotes a peak with respect to a crystal plane corresponding to a crystal direction of <003>, "102" denotes a peak with respect to a crystal plane corresponding to a crystal direction of <102>, "104" denotes a peak with respect to a crystal plane corresponding to a crystal direction of <104>, "009" is the peak with respect to a crystal plane corresponding to a crystal direction of <009>, and "110" denotes a peak with respect to a crystal plane corresponding to a crystal direction of <110>, respectively.

A plurality of crystal grains included in the sintered cathode layer of a battery according to an embodiment are aligned in a direction of high electrical conductivity. A cathode layer of a battery described above is a sintered cathode layer having a high sintered density without including a binder and a conductive material. Accordingly, when a battery described above is used, only a cathode active material without a binder and a conductive material is used, and thus, portion of an active material may be increased, thereby increasing energy density of the battery compared to an existing battery. In addition, the sintered cathode layer of the battery described above includes a plurality of grooves (for example, slits or trenches), and primary crystal directions of side surfaces exposed through, e.g., exposed by or adjacent to, the plurality of grooves are aligned with a <101> crystal direction, a <hk0> crystal direction, wherein h and k are integers equal to or greater than 1, or a combination thereof, of the crystal grains of the cathode active material. The crystal directions <101> and <110> may have a relatively large lithium ion diffusion coefficient compared to other crystal directions, such as <004> and <104>. In addition, the crystal grains included in the cathode layer are aligned in a direction of high electrical conductivity. Therefore, when the battery described above is used, lithium ions may be rapidly diffused into an entire area of the cathode layer, and thus, the battery capacity may be increased, charge/discharge characteristics may also be improved, and high rate characteristics may also be improved.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A battery comprising:
    a cathode layer;
    a cathode current collector on the cathode layer;
    an anode layer on the cathode layer;
    an anode current collector on the anode layer;
    a separator between the cathode layer and the anode layer; and
    an electrolyte between the cathode layer and the anode layer,
wherein the cathode layer comprises
    a plurality of crystal grains of a cathode active material and aligned in a first direction, and
    at least one groove formed in a direction perpendicular to an upper surface of the cathode layer that is in contact with the separator, and
    wherein a side surface of the cathode layer exposed by the at least one groove is aligned with a <101> crystal direction, a <hk0> crystal direction wherein h and k are integers greater than or equal to 1, or a combination thereof, of the crystal grains of the cathode active material.

2. The battery of claim 1,
    wherein the at least one groove is between a first outer side surface of the cathode layer and a second outer side surface of the cathode layer, wherein the second outer side surface is opposite the first outer side surface, and
    wherein crystal grains of the first side surface and crystal grains of the second side surface each have a same crystal direction as crystal grains of the side surface of the cathode layer exposed by the at least one groove.

3. The battery of claim 1, wherein the at least one groove is a slit-shaped groove.

4. The battery of claim 1, wherein the at least one groove has a trench shape.

5. The battery of claim 1,
    wherein a width of the at least one groove is less at a bottom surface of the cathode layer than a width of the at least one groove at an upper surface of the cathode layer, and
    wherein a depth of the at least one groove is greater than a distance between an end of the at least one groove proximate the bottom surface of the cathode layer and the bottom surface of the cathode layer.

6. The battery of claim 1,
    wherein the at least one groove comprises a plurality of grooves, and
    wherein depths of the plurality of grooves are within 1 standard deviation, based on total depths of the plurality of grooves.

7. The battery of claim 1, wherein a ratio R in Equation 1 is in a range from about 2.7 to about 10.6, $$R = (I(101) + I(110))/I(003) \quad \text{Equation 1}$$

wherein
    I(101) is an intensity of an X-ray diffraction peak corresponding to a (101) crystal plane,
    I(110) is an intensity of an X-ray diffraction peak corresponding to a (110) crystal plane,
    I(003) is an intensity of an X-ray diffraction peak corresponding to a (003) crystal plane, when determined using Cu Kα radiation.

8. The battery of claim 1, wherein a relative density of the cathode layer is about 90% to about 99%, based on a density of the of the cathode layer before sintering.

9. The battery of claim 5, wherein
    a thickness of the cathode layer is in a range from about 30 micrometers to about 200 micrometers, and
    a distance between the end of a groove proximate to the bottom surface of the cathode layer and the bottom surface of the cathode layer is in a range from about 5 micrometers to about 50 micrometers.

10. The battery of claim 1, wherein the cathode active material layer is isostructural with α-NaFeO$_2$.

11. A method of manufacturing a battery, the method comprising:
    providing a cathode layer comprising a plurality of crystal grains of a cathode active material;
    forming at least one groove between a first side surface of the cathode layer and a second side surface of the cathode layer;
    disposing a cathode current collector on a surface of the cathode layer under the at least one groove;
    providing an anode layer;
    disposing an anode current collector on a surface of the anode layer;
    disposing a separator on a surface of the cathode layer in which the at least one groove is formed;
    supplying an electrolyte to the separator; and
    disposing the anode layer on the separator to manufacture the battery,
    wherein a side surface of the cathode layer exposed by the at least one groove is aligned with a <101> crystal direction, a <hk0> crystal direction wherein h and k are integers greater than or equal to 1, or a combination thereof, of the crystal grains of the cathode active material.

12. The method of claim 11, further comprising forming the cathode layer by:

disposing a cathode active material on a substrate to form a cathode active material tape;

forming the at least one groove in a direction perpendicular to a surface of the cathode active material tape; and sintering the cathode active material tape to form the cathode layer.

13. The method of claim 12, wherein the forming of the at least one groove comprises forming at least one slit in the cathode active material tape.

14. The method of claim 12, wherein the forming of the at least one groove comprises forming at least one trench in the cathode active material tape.

15. The method of claim 11, wherein the forming of the at least one groove comprises forming the at least one groove in a direction from an upper surface towards a bottom surface of the cathode layer, and a depth of the at least one groove is greater than a distance between an end of the at least one groove proximate the bottom surface of the cathode layer and a bottom surface of the cathode layer.

16. The method of claim 11, wherein a ratio R in Equation 1 is in a range from about 2.7 to about 10.6, $$R=(I(101)+I(110))/I(003) \qquad \text{Equation 1}$$

wherein

I(101) is an intensity of an X-ray diffraction peak corresponding to a (101) crystal plane, I(110) is an intensity of an X-ray diffraction peak corresponding to a (110) crystal plane, I(003) is an intensity of an X-ray diffraction peak corresponding to a (003) crystal plane, when determined using Cu Kα radiation.

17. The method of claim 13, wherein a plurality of slits having a same depth are formed in the cathode active material tape.

18. The method of claim 11, wherein a relative density of the cathode layer is about 90% to about 99%, based on a density of the of the cathode layer before sintering.

19. A cathode layer comprising:

a plurality of crystal grains of a cathode active material and aligned in a first direction; and at least one groove formed in a direction perpendicular to a surface of the cathode layer, wherein a side surface of the cathode layer exposed by the at least one groove is aligned with a <101> crystal direction, a <hk0> crystal direction wherein h and k are integers greater than or equal to 1, or a combination thereof, of the crystal grains of the cathode active material.

20. The cathode active material layer of claim 18, wherein the cathode active material layer is isostructural with α-$NaFeO_2$.

* * * * *